United States Patent [19]

Davidjuk et al.

[11] 4,200,929
[45] Apr. 29, 1980

[54] INPUT DEVICE FOR DELIVERY OF DATA FROM DIGITAL TRANSMITTERS

[76] Inventors: Alexandr D. Davidjuk, prospekt Voroshilova, 7a, kv. 18; Anatoly A. Koshevoi, Tverskoi Tupik, 9, kv. 62; Viktor J. Lapy, ulitsa Chekistov, 24, kv. 16; Vasily N. Frankov, prospekt Voroshilova, 17a, kv. 141, all of Kiev, U.S.S.R.

[21] Appl. No.: 871,395

[22] Filed: Jan. 23, 1978

[51] Int. Cl.² .............................................. G06F 9/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,006,465 | 2/1977 | Cross | 364/200 |
| 4,079,452 | 3/1978 | Larson | 364/900 |

Primary Examiner—Gareth D. Shaw
Assistant Examiner—David Y. Eng
Attorney, Agent, or Firm—Fleit & Jacobson

[57] ABSTRACT

A digital device for monitoring objects whose states are characterized by two-positioned signals, e.g., yes-no, on-off, etc., allows necessary instructions to be formed, on the basis of an analysis of these signals, and transmits them to other digital external devices, such as digital computers, recorders and displays. Various instructions are stored in a memory and can be selected at random, and read out and applied to the external devices during data presentation, or can be used in controlling the operation of the inventive device during an analysis of the states of the devices being monitored. The instruction memory can also be charged with various programs to apply data to the external devices. Such data application program is selected by analyzing the state of the monitored device, at the moment it has changed state. The processing of such programs is discontinued if a higher-priority data transmission means is ready to transmit data. The higher priority data transmission means then resets a counter and register their initial state, and the unconditional transfer instruction is read from the instruction memory. The inventive input device scans the data transmission means which has recently changed state, in accordance with a predetermined priority scheme. The inventive device does not connect the data transmitter and receiver directly but, by analyzing the signals received from the monitored devices, in accordance with the programs stored in the memory, the inventive device applies the necessary instructions or addresses to the output buses, which are connected to various types of equipment, e.g., a digital computer.

1 Claim, 1 Drawing Figure

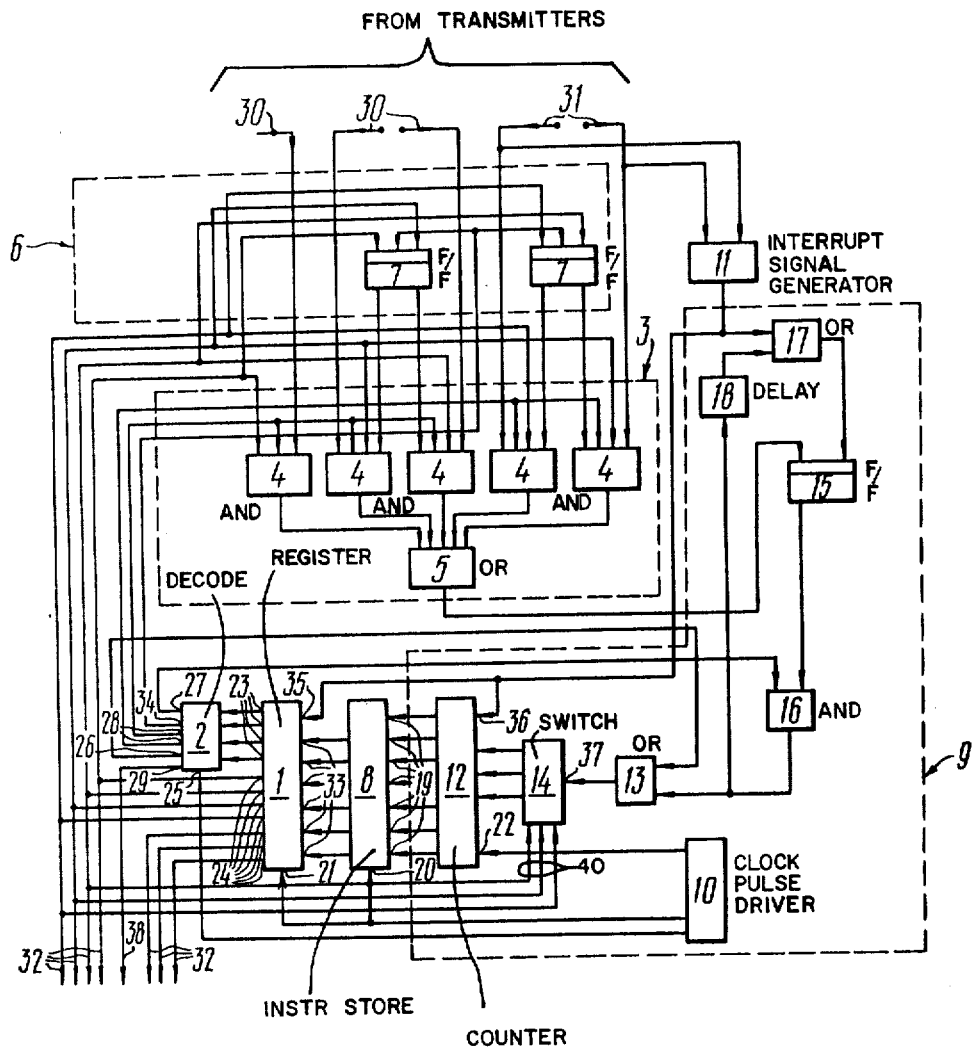

4,200,929

INPUT DEVICE FOR DELIVERY OF DATA FROM DIGITAL TRANSMITTERS

FIELD OF THE INVENTION

The invention relates to means that provide for communication between peripheral data sources and a digital computer, and more particularly to an input device for delivery of data from digital transmitters, which device may be used as a special-purpose input/output channel providing for conversion of digital information in accordance with programs held in a storage associated with that device.

The device of the invention is applicable to different control and monitoring systems provided with transmitters whose states are characterized by two-position signals such as "yes-no" and "on-off". Note that the data to describe how these signals are responded is predetermined, encoded and stored in a respective instruction storage.

Known in the art is an input device for delivery of data from digital transmitters (cf. the USSR Inventor's Certificate No. 399,854, cl. G06 f 3/4) comprising an input signal switch, a register, a decoder, an instruction storage, a transmitter previous state storage, a transmitter state change acknowledgement signal generator, AND gates, OR gates, NOT gates, and a control unit. In said device, the states of several groups of digital transmitters are tested using hardware facilities. Status information relating to the outputs of each group of digital transmitters is compared continuously with an appropriate information held in the transmitter previous state storage and data is entered in a digital computer only when it is revealed that a given transmitter changes state. In this case, the device generates only one output signal that specifies the address of the transmitter that changed state. This does not allow the known device to be used in conjunction with several data destinations such as digital computers or several data presentation means displaying the states of the transmitters being tested such as teletypewriters and illuminated indicator boards which can accept input data only in the form of a train of code signals.

In the known device, the transmitter previous state storage is implemented as a chain of shift registers which have their total number of storage cells equal to the total number of the transmitters being tested, each transmitter being assigned a certain storage cell. The transmitter previous state storage therefore features a relatively complex inner structure. This tends to limit functional capabilities of the device and does not allow current data to be input from transmitters whose previous states need not be remembered, with the result that its flexibility is low when it is operated to input data in many control and monitoring systems.

In the known device, the current states of the transmitters are tested and compared with previous states in succession. Therefore, it is impossible to use the device in cases where transmitters are assigned certain priorities.

SUMMARY OF THE INVENTION

An object of the invention is to provide for an input device for delivery of data from digital transmitters, which is able to operate in conjunction with several data destinations such as ditial computers, teletypwriters or illuminated indicator boards.

Another object of the invention is to provide for a simpler circuitry of the transmitter previous state storage.

Still another object of the invention is to provide for an input device for delivery of data from digital transmitters whose previous states need not be remembered.

Another object of the invention is to provide for an absolute priority of inputting data from the most important transmitters.

These and other objects of the invention are attained in input device for delivery of data from digital transmitters (hereinafter referred to as a digital input device), comprising a register, a decoder, a transmitter state change acknowledgement signal generator provided with an OR gate and AND gates, and AND gates, whose number is equal to that of transmitter message outputs, having its outputs coupled to the inputs of the OR gate, said digital input device being provided with a transmitter previous state storage comprised of storage cells, each storage cell having its output coupled to a first input of a respective AND gate of the transmitter state change acknowledgement signal generator, second inputs of the AND gates being coupled to respective transmitter outputs, third inputs of the AND gates being coupled to an input of a respective output group of the decoder having its inputs coupled to a first output group of the register, and fourth inputs of the AND gates being coupled to respective output buses of the digital input device, coupled to a second output group of the register, the digital input device being provided with an instruction storage having its message outputs coupled to the register inputs and a control unit having its input coupled to the output of the OR gate of the transmitter state change acknowledgement signal generator and provided with a clock pulse driver having its output coupled to the control inputs of the instruction storage and the register, the digital input device being also provided with a priority transmitter-operated interrupt signal generator having its inputs coupled to priority transmitter message outputs, the instruction storage being implemented as a random access device, the storage cells of the transmitter previous state storage being implemented as flip-flops having their "1" and "0" set inputs being coupled to respective output buses and having their synchronization inputs coupled to an output of a respective output group of the decoder, the control unit being provided with a counter, two OR gates, a static flip-flop, an AND gate, a switch having its inputs coupled to respective output buses of the digital input device and having its enabling input coupled to the output of a first OR gate of the control unit, said first OR gate having its input coupled to a first separate output of the decoder, and a delay circuit whose output is coupled to a first input of a second OR gate of the control unit, having its second input coupled to the output of the priority transmitter-operated interrupt signal generator, which, in turn, is coupled to the reset inputs of the register and the counter which has its "1" set inputs coupled to the switch outputs and has its outputs coupled to address inputs of the instruction storage, the output of the second OR gate of the control unit being coupled to the "0" set input of the static flip-flop having its "1" set input being coupled to the output of the OR gate of the transmitter state change acknowledgement signal generator, the output of the static flip-flop being coupled to a first input of the AND gate having its second input coupled to a second separate output of the decoder and having its output coupled to a second input of the first OR gate of the control unit and to the input of the delay circuit, the clock pulse driver being provided with two additional outputs, one of which being coupled to the counting input of the counter and the other being coupled to the pulse input of the decoder having an output of its respective output group coupled to a separate output synchronization bus of the digital input device.

The digital input device of the invention uses its random access instruction storage and its control unit to test the transmitters in accordance with a program corresponding to each specific case, operates to input data into a computer and to output data to recorders and indicators.

The transmitter previous state storage features a more simple circuitry due to the fact that it can utilize conventional flip-flop storage cells.

The priority transmitter-operated interrupt signal generator can provide, in conjunction with the control unit, for an absolute priority of inputting data from the most important transmitters such as emergency transmitters.

DESCRIPTION OF THE DRAWING

Other features and advantages of the invention will appear from the following description of a preferred embodiment thereof in conjunction with an accompanying drawing which is a block diagram of an input device for delivery of data from digital transmitters, according to the invention.

DETAILED DESCRIPTION OF THE INVENTION

The digital input device of the invention comprises a register 1, a decoder 2 and a transmitter state change acknowledgement signal generator 3 incorporating AND gates 4 and an OR gate 5.

The number of the AND gates 4 is equal to that of the transmitter message outputs, and the outputs of the AND gates 4 are coupled to the inputs of the OR gate 5.

The digital input device of the invention also comprises a transmitter previous state storage 6 incorporating storage cells 7, a random access instruction storage 8 for holding working programs of the device, and a control unit 9 incorporating a clock pulse driver 10 provided with three outputs.

There is also a priority transmitter-operated interrupt signal generator 11. The control unit 9 includes a counter 12, a first OR gate 13, a switch 14, a static flip-flop 15, an AND gate 16, a second OR gate 17, and a delay circuit 18.

The number of the storage cells 7 in the transmitter previous state storage 6 is equal to the number of the transmitters whose previous states must be remembered.

The output of the OR gate 5 is coupled to the "1" set input of the static flip-flop 15 of the control unit 9.

Coupled to address inputs 19 of the random access instruction storage 8 are the outputs of the counter 12 having its "1" set inputs coupled to the outputs of the switch 14.

A first output of the clock pulse driver 10 is coupled to control inputs 20, 21 of the random access instruction storage 8 and the register 1, respectively, while a second output of the clock pulse driver 10 is coupled to a counting input 22 of the counter 12.

The register 1 is provided with a first output group 23 coupled to potential inputs of the decoder 2 and with a second output group 24.

The decoder 2 has a pulse input 25 which connects a third output of the clock pulse driver 10, a first separate output 26 coupled to a first input of the first OR gate 13, and a second separate output 27 coupled to a first input of the AND gate 16 having its second input coupled to the output of the static flip-flop 15 and having its output coupled to a second input of the first OR gate 13 and to the input of the delay circuit 18.

The storage cells 7 of the transmitter previous state storage 6 are implemented as flip-flops provided with "1" and "0" set inputs, synchronization inputs and with direct and inverse outputs each being coupled to a first input of respective AND gate 4.

Second inputs of the AND gates 4 are coupled to outputs 28 of a first output group of the decoder 2.

Third inputs of the AND gates 4 are coupled to transmitter message outputs 30,31. Priority transmitter message outputs 31 being coupled to the inputs of the priority transmitter-operated interrupt signal generator 11.

Outputs of the second output group 24 of the register 1 are coupled to output buses 32 of the digital input device.

Some outputs of the second output group 24 are coupled to fourth inputs of the AND gates 4, to the "1" and "0" set inputs of the storage cells 7 and to respective inputs of the switch 14.

Message outputs of the random access instruction storage 8 are coupled to inputs 33 of the register 1.

Outputs of a third output group 34 of the decoder 2 are coupled to synchronization inputs of the storage cells 7.

The output of the priority transmitter-operated interrupt signal generator 11 is coupled to a first input of the second OR gate 17 and to reset inputs 35, 36 of the register 1 and the counter 12, respectively.

Coupled to a second input of the second OR gate 17 is the output of the delay circuit 18 and coupled to the "0" set input of the static flip-flop 15 is the output of the second OR gate 17.

An enabling input 37 of the switch 14 is coupled to the output of the first OR gate 13.

The output (29) of the second output group of the decoder 2 is coupled to a separate output synchronization bus 38 for synchronizing the output of data to peripheral devices.

The digital input device of the invention operates as follows.

In accordance with an address code present on the outputs of the counter 12 and a pulse applied to the control input 20 of the random access instruction storage 8 from the clock pulse driver 10, an instruction is read off the outputs of the storage 8 and is stored in the register 1. Present on the output of the latter are two parts of the instruction as follows: an operation part on lines 23 and an address part on lines 24.

The operation part of the instruction is passed from respective outputs of the first output group 23 to the potential inputs of the decoder 2 whose pulse input 25 accepts a signal from the clock pulse driver 10. Depending on the contents of the operation part of the instruction, the outputs 26,27,28,29 and 34 of the decoder 2 produce signals used to:

control the writing of the address part of the instruction delivered from the outputs 24 on lines 40 via the switch 14 to the counter 12 during unconditional transfer operations, the signal being available from the output 26 of the decoder 2;

control the writing of the address part of the instruction delivered from the outputs 24 via the switch 14 to the counter 12 during conditional transfer operations, the signal being available from the output 27 of the decoder 2;

specify a group of transmitters to be analyzed by the transmitter state change acknowledgement signal generator 6 during transmitter state analysis operations, the signal being available from the outputs 28 of the decoder 2;

specify a group of the storage cells 7 of the transmitter previous state storage 6 during transmitter current state remember operations, the signal being available from the output 34 of the decoder 2;

synchronize the output of data from the output buses 32 to a digital computer or other peripheral devices, the signal being available from the output 29 of the decoder 2.

The drawing illustrates one output 29 and one output 34 in respective output groups of the decoder 2. However, any desirable number of the above outputs can be provided and that number depends on the number of groups of the storage cells 7 of the transmitter previous state storage 6 and on the number of external destinations receiving data from the output buses 32.

The address part of the instruction available from outputs of the second output group 24 of the register 1 is used, depending on the operation part of the instruction, to:

specify the address of the next instruction during operations concerned with conditional and unconditional transfer;

specify the no. of a transmitter in a group of transmitters analyzed by the transmitter state change acknowledgement signal generator 3 during transmitter state analysis operations;

specify the no. of a storage cell 7 in the selected group of the storage cells 7 of the transmitter previous state storage 6 during transmitter current state remember operations;

place data on the output buses 32 during operations concerned with inputting data into a digital computer and placing data on peripheral devices.

The operating modes of the digital input device are as follows:

searching for a transmitter that changed state;

outputting data to a digital computer and other peripheral device using programs held in the random access instruction storage 8, according to the no. of the transmitter that changed state;

interruption of the programs in order to service priority transmitters.

During the operating mode that searches for a transmitter with changed state, the digital input device cyclically tests message signals from the transmitters and compares them with respective signals located in the storage cells 7, these actions being performed in transmitter groups assigned specific priorities. In this case, the group and no. of a transmitter in the group are determined by signals present, respectively, on the output 28 of the decoder 2 and on the output 24 of the register 1.

The test result obtained from each AND gate 4 is delivered through the OR gate 5 to the "1" set input of the static flip-flop 15 of the control unit 9 and is stored therein.

After the state of each transmitter has been tested, a conditional transfer instruction is executed. If the transmitter being tested changes state, control is transferred to a subroutine that outputs data to peripheral devices. Otherwise, the address of the next transmitter state test instruction is formed. To this end, the contents of the counter 12 is incremented by a unit pulse applied to the counting input 22 from the output of the clock pulse driver 10.

If the analysis of the transmitter state reveals that a unit signal is present on the output of the static flip-flop 15 (which means that the transmitter being tested has changed state), then the address of the subroutine that outputs data to peripheral devices is placed in the counter 12 via the switch 14 from the outputs 24 of the register 1.

In this case, a control pulse from the output 27 of the decoder 2 is applied to the first input of the AND gate 16, whose second input accepts an enabling signal from the output of the static flip-flop 15, and is then passed through the AND gate 16 and the first OR gate 13 to the enabling input 37 of the switch 14.

The same pulse from the output of the AND gate 16 and through the delay circuit 18 and the second OR gate 17 is applied to the "0" set input of the static flip-flop 15 to reset the latter.

Now, the digital input device is shifted to a state in which the subroutine for outputting data on peripheral devices via the output buses 32 is executed. Data is placed on peripheral devices according to a signal from the output 29 of the decoder 2.

In the operating mode that inputs data in a digital computer and outputs data to peripheral devices according to a program stored in the random access instruction storage 8, codewords are placed in succession on the output buses 32. After data is output to peripheral devices respective storage cell 7 of the transmitter previous state storage 6 is placed in a state corresponding to the current state of the transmitter.

In order to remove control from the peripheral device data output subroutine, use is made of an unconditional transfer instruction.

The address of a new program, present on the outputs 24 of the register 1, is placed in the counter 12 via lines 40 through the switch 14 and a control pulse passes in this case from the output 26 of the decoder 2 to the enabling input 37 of the switch 14 via the OR gate 13.

The program interruption mode during which priority transmitters are serviced is provided by the priority transmitter-operated interrupt signal generator 11 whose input accepts priority transmitter signals from the message outputs 31. According to a signal from a priority transmitter, the priority transmitter-operated interrupt signal generator 11 produces a unit pulse applied to the reset inputs 35,36 of the register 1 and the counter 12, respectively, and then delivered to the "0" set input of the static flip-flop 15 via the second OR gate 17.

According to the starting address contained in the counter 12, an unconditional transfer instruction is read out of the random access instruction storage 8 which places the digital input device in the operating mode that searches for a transmitter with changed state.

In this operating mode, a transmitter that changed state is searched for according to a preset priority scheme and the digital input device is forced to execute a program corresponding to a given priority transmitter after the transmitter that changed state has been identified.

After the priority program has been executed, respective storage cell 7 is placed in a state corresponding to the current state of the priority transmitter and control is transferred to the subroutine that searches for a transmitter with changed state, that subroutine being executed in a manner described above. The address of the unconditional transfer and the conditional transfer instruction, when written into the counter 12, is incremented by 1, since a unit pulse applied to the counting input 22 from the clock pulse driver 10 is added to the contents of the counter 12.

What is claimed is:

1. A digital input device having output buses for delivery of data from digital transmitters, comprising:
   - a register (1) provided with message inputs (33), a control input (21), a reset input (35), a first output group (23), and a second output group (24);
   - a decoder (2) provided with message inputs (23) coupled to said first output group of said register, a pulse input (25), a first separate output (26), a second separate output (27), a first output group (28), a second output group (29), and a third output group (34);
   - a transmitter state change acknowledgement signal generator (3) provided with an OR gate (5) and AND gates (4) whose number is equal to that of message outputs of said transmitters, said AND gates having their outputs coupled to the inputs of said OR gate;
   - a transmitter previous state storage incorporating storage cells in the form of flip-flops (7) provided with "1" and "0" set inputs, synchronization inputs, and outputs;
   - each of said AND gates of said transmitter state change acknowledgement signal generator being provided with a first, a second, a third and a fourth input, said first input (30, 31) of said AND gate being coupled to a respective message output of said transmitter, said second input of said AND gate being coupled to a respective output of said outputs of said flip-flop (7) of said transmitter previous state storage, said third input of said AND gate being coupled to a respective output of said first output group (28) of said decoder (2), said fourth input of said AND gate being coupled to a respective output of said second output group (24) of said register (1), respective outputs of said second output group of said register being coupled to said "1" and "0" set inputs of said flip-flops (7), said synchronization inputs of said flip-flops being coupled to a respective output of said third output group (34) of said decoder;
   - a random access instruction storage (8) provided with address inputs (19), a control input (20) and message outputs (33) coupled to said message inputs of said register (1);
   - a priority transmitter-operated interrupt signal generator (11) provided with inputs (31) coupled to message outputs of said transmitters, and an output;
   - a control unit (9) provided with a clock pulse driver (10), a first OR gate (13), a second OR gate (17), and AND gate (16), a counter (12), a switch (14), a static flip-flop (15), and a delay circuit (18);
   - said counter provided with "1" set inputs (from 14), a counting input (22), a reset input (36), and outputs coupled to said address inputs of said random access instruction storage;
   - said clock pulse driver provided with a first output coupled to said control inputs of said register (21) and said random access instruction storage (20), a second output (25) coupled to said pulse input of said decoder (2), and a third output (22) coupled to said counting input of said counter (12);
   - said switch (14) provided with an enabling input (37), message inputs (40), and outputs coupled to said "1" set inputs of said counter;
   - said first OR gate (13) of said control unit, provided with a first input, a second input (26) coupled to said first separate output of said decoder, and an output coupled to said enabling input (37) of said switch;
   - said AND gate (16) of said control unit, provided with a first input, a second input coupled to said second separate output (27) of said decoder, and an output coupled to said first input of said first OR gate (13) of said control unit and to the input of said delay circuit (18);
   - said static flip-flop (15) provided with an "0" set input, a "1" set input coupled to the output of said OR gate (5) of said transmitter state change acknowledgement signal generator, and an output coupled to said first input of said AND gate (16) of said control unit;
   - said second OR gate (17) of said control unit, provided with a first input coupled to the output of said delay circuit (18), a second input coupled to said output of said priority transmitter-operated interrupt signal generator (11), said last output being also coupled to said reset inputs (36), (35) of said counter and said register, the output of said second OR gate being coupled to said "0" set input of said static flip-flop;

wherein, a first portion of said output buses of said digital input device are coupled to respective outputs of said second output group (24) of said register, another portion of said output buses (32) being coupled to said fourth inputs of said AND gates (4) of said transmitter state change acknowledgement signal generator (3), and a separate one of said output buses being coupled to a respective output of said second output group (29) of said decoder (2).

* * * * *